US012608482B2

(12) United States Patent
Boulton et al.

(10) Patent No.: US 12,608,482 B2
(45) Date of Patent: Apr. 21, 2026

(54) DETERMINING A SECURITY SCORE IN BINARY SOFTWARE CODE

(71) Applicant: BlackBerry Limited, Waterloo (CA)

(72) Inventors: Adam John Boulton, Wirral (GB); William James McCourt, West Lothian (GB); Paul Compton Hirst, Tiverton (GB); Benjamin John Godwood, Chipping Norton (GB)

(73) Assignee: BlackBerry Limited, Waterloo (CA)

( * ) Notice: Subject to any disclaimer, the term of this patent is extended or adjusted under 35 U.S.C. 154(b) by 553 days.

(21) Appl. No.: 16/672,183

(22) Filed: Nov. 1, 2019

(65) Prior Publication Data

US 2021/0133330 A1     May 6, 2021

(51) Int. Cl.
G06F 21/57          (2013.01)
G06F 9/54           (2006.01)

(52) U.S. Cl.
CPC ............ G06F 21/577 (2013.01); G06F 9/541 (2013.01); G06F 2221/033 (2013.01)

(58) Field of Classification Search
None
See application file for complete search history.

(56) References Cited

U.S. PATENT DOCUMENTS

| | | | | |
|---|---|---|---|---|
| 7,487,544 B2 * | 2/2009 | Schultz | ................. | G06F 21/562 |
| | | | | 713/188 |
| 7,519,997 B2 * | 4/2009 | Shipp | .................... | G06F 21/562 |
| | | | | 713/188 |

| | | | | |
|---|---|---|---|---|
| 8,171,549 B2 * | 5/2012 | Radatti | ................. | G06F 21/563 |
| | | | | 713/168 |
| 8,819,856 B1 * | 8/2014 | Tiffe | ..................... | G06F 21/125 |
| | | | | 726/31 |
| 9,135,442 B1 * | 9/2015 | Kennedy | ............... | G06F 21/563 |
| 9,558,348 B1 * | 1/2017 | Muttik | ................... | G06Q 50/00 |
| 10,229,273 B2 * | 3/2019 | Sheth | ........................ | G06F 8/75 |
| 10,356,108 B2 * | 7/2019 | Li | ......................... | G06F 16/435 |
| 10,868,825 B1 * | 12/2020 | Dominessy | ......... | H04L 63/1433 |
| 10,929,532 B1 * | 2/2021 | Margaritelli | ........... | G06N 20/00 |
| 11,222,113 B1 * | 1/2022 | Li | ......................... | G06F 21/568 |
| 11,544,383 B2 * | 1/2023 | Ofek | ..................... | G06F 21/554 |

(Continued)

FOREIGN PATENT DOCUMENTS

| | | | | |
|---|---|---|---|---|
| EP | 2756366 B1 * | 1/2020 | ............. | G06F 21/54 |
| WO | WO-2017197519 A1 * | 11/2017 | ........ | G06F 16/9024 |
| WO | WO-2020161622 A1 * | 8/2020 | ............. | G06F 21/52 |

OTHER PUBLICATIONS

M. G. Schultz, E. Eskin, F. Zadok and S. J. Stolfo, "Data mining methods for detection of new malicious executables," Proceedings 2001 IEEE Symposium on Security and Privacy. S&P 2001, Oakland, CA, USA, 2001, pp. 38-49, doi: 10.1109/SECPRI.2001. 924286.*

(Continued)

*Primary Examiner* — Syed A Zaidi
*Assistant Examiner* — Vadim Savenkov
(74) *Attorney, Agent, or Firm* — Fish & Richardson P.C.

(57) ABSTRACT

Systems, methods, and software can be used to determine a security score of a binary software code. In some aspects, a computer-implemented method comprises: receiving a binary software code; inspecting the binary software code to determine at least one Common Vulnerability Scoring Standard (CVSS) factor; and determining a CVSS score based on the at least one CVSS factor.

15 Claims, 8 Drawing Sheets

200

202 — RECEIVING, BY AT LEAST ONE HARDWARE PROCESSOR, A BINARY SOFTWARE CODE

204 — INSPECTING, BY THE AT LEAST ONE HARDWARE PROCESSOR, THE BINARY SOFTWARE CODE TO DETERMINE AT LEAST ONE SECURITY FACTOR

206 — DETERMINING, BY THE AT LEAST ONE HARDWARE PROCESSOR, A SECURITY SCORE BASED ON THE AT LEAST ONE SECURITY FACTOR

(56)             References Cited

U.S. PATENT DOCUMENTS

| | | | | |
|---|---|---|---|---|
| 11,556,640 | B1* | 1/2023 | Tully | G06F 21/562 |
| 2003/0065926 | A1* | 4/2003 | Schultz | G06F 21/562 |
| | | | | 713/188 |
| 2004/0111713 | A1 | 6/2004 | Rioux | |
| 2006/0026675 | A1* | 2/2006 | Cai | G06F 21/562 |
| | | | | 726/22 |
| 2006/0053295 | A1* | 3/2006 | Madhusudan | H04L 63/145 |
| | | | | 713/181 |
| 2011/0145921 | A1* | 6/2011 | Mathur | G06F 21/52 |
| | | | | 726/23 |
| 2012/0023112 | A1* | 1/2012 | Levow | G06F 21/564 |
| | | | | 711/E12.007 |
| 2012/0159625 | A1* | 6/2012 | Jeong | G06F 21/562 |
| | | | | 726/23 |
| 2012/0304300 | A1 | 11/2012 | LaBumbard | |
| 2013/0097706 | A1* | 4/2013 | Titonis | G06F 21/566 |
| | | | | 726/22 |
| 2013/0276118 | A1* | 10/2013 | Kashyap | H04L 63/1416 |
| | | | | 726/24 |
| 2014/0215614 | A1* | 7/2014 | Beskrovny | G06F 21/51 |
| | | | | 726/23 |
| 2015/0135323 | A1* | 5/2015 | Guan | G06F 21/564 |
| | | | | 726/24 |
| 2017/0046510 | A1* | 2/2017 | Chen | G06F 21/552 |
| 2017/0201532 | A1* | 7/2017 | Go | H04L 63/1483 |
| 2017/0262633 | A1* | 9/2017 | Miserendino | G06N 5/025 |
| 2017/0277890 | A1* | 9/2017 | Hayrynen | G06F 21/51 |
| 2017/0300691 | A1* | 10/2017 | Upchurch | G06F 21/12 |
| 2017/0316213 | A1 | 11/2017 | McClintock et al. | |
| 2017/0329701 | A1* | 11/2017 | Patnaik | G06F 11/3688 |
| 2018/0054449 | A1* | 2/2018 | Nandha Premnath | |
| | | | | G06F 21/566 |
| 2018/0129812 | A1 | 5/2018 | Kang et al. | |
| 2018/0285567 | A1* | 10/2018 | Raman | G06F 21/566 |
| 2018/0309854 | A1* | 10/2018 | Lee | G06F 8/425 |
| 2019/0102564 | A1 | 4/2019 | Li et al. | |
| 2019/0205542 | A1* | 7/2019 | Kao | G06F 8/70 |
| 2019/0213323 | A1* | 7/2019 | Tumblin | G06F 21/52 |
| 2019/0250911 | A1* | 8/2019 | Lospinuso | G06F 8/75 |
| 2019/0258803 | A1* | 8/2019 | Murthy | G06F 21/577 |
| 2019/0377565 | A1* | 12/2019 | Murthy | G06F 21/52 |
| 2020/0082094 | A1* | 3/2020 | Mcallister | G06F 8/77 |
| 2020/0082095 | A1* | 3/2020 | Mcallister | G06F 11/323 |
| 2020/0092306 | A1* | 3/2020 | Jusko | G06F 16/285 |
| 2020/0097656 | A1* | 3/2020 | Burke | G06F 21/565 |
| 2020/0097662 | A1* | 3/2020 | Hufsmith | H04L 9/0643 |
| 2020/0137126 | A1* | 4/2020 | Yawalkar | H04L 63/1408 |
| 2020/0242254 | A1* | 7/2020 | Velur | G06F 21/577 |
| 2020/0364336 | A1* | 11/2020 | Boulton | G06F 21/577 |
| 2020/0380124 | A1* | 12/2020 | Yavuz | G06N 7/01 |

OTHER PUBLICATIONS

I. Santos, F. Brezo, X. Ugarte-Pedrero, and P. G. Bringas, 'Opcode sequences as representation of executables for data-mining-based unknown malware detection', Information Sciences, vol. 231, pp. 64-82, 2013.*

G. Balan and A. S. Popescu, "Detecting Java Compiled Malware using Machine Learning Techniques," 2018 20th International Symposium on Symbolic and Numeric Algorithms for Scientific Computing (SYNASC), Timisoara, Romania, 2018, pp. 435-439, doi: 10.1109/SYNASC.2018.00073.*

Kim, B., Im, C., & Jung, H. (2010). Suspicious Malicious Web Site Detection with Strength Analysis of a JavaScript Obfuscation.*

Notice of Allowance issued in U.S. Appl. No. 16/667,896 on Sep. 2, 2021, 10 pages.

Extended European Search Report issued in European Application No. 20199109.8 on Jan. 13, 2021, 8 pages.

Non-Final Office Action issued in U.S. Appl. No. 16/667,896 on Jun. 17, 2021, 37 pages.

Communication Pursuant to Article 94 (3) EPC in European Appln No. 20199109.8, dated Jan. 5, 2023, 6 pages.

* cited by examiner

| FACTOR VALUE | DESCRIPTION |
|---|---|
| NETWORK (N) | A VULNERABILITY EXPLOITABLE WITH NETWORK ACCESS MEANS THE VULNERABLE COMPONENT IS BOUND TO THE NETWORK STACK AND THE ATTACKER'S PATH IS THROUGH OSI LAYER THREE (THE NETWORK LAYER). SUCH A VULNERABILITY IS OFTEN TERMED "REMOTELY EXPLOITABLE" AND CAN BE THOUGHT OF AS AN ATTACK BEING EXPLOITABLE ONE OR MORE NETWORK HOPS AWAY (e.g. ACROSS LAYER THREE BOUNDARIES FROM ROUTERS). AN EXAMPLE OF A NETWORK ATTACK IS AN ATTACKER CAUSING A DENIAL OF SERVICE (DoS) BY SENDING A SPECIALLY CRAFTED TCP PACKET FROM ACROSS THE PUBLIC INTERNET (e.g CVE 2004 0230) |
| ADJACENT | A VULNERABILITY EXPLOITABLE WITH ADJACENT NETWORK ACCESS MEANS THE VULNERABLE COMPONENT IS BOUND TO THE NETWORK STACK, HOWEVER THE ATTACK IS LIMITED TO THE SAME SHARED PHYSICAL (e.g. BLUETOOTH, IEEE 802.11), OR LOGICAL (e.g. LOCAL IP SUBNET) NETWORK, AND CANNOT BE PERFORMED ACROSS AN OSI LAYER THREE BOUNDARY (e.g. a ROUTER). AN EXAMPLE OF AN ADJACENT ATTACK WOULD BE AN ARP (IPv4) OR NEIGHBOR DISCOVERY (IPv6) FLOOD LEADING TO A DENIAL OF SERVICE ON THE LOCAL LAN SEGMENT. SEE ALSO CVE 2013 6014 |
| LOCAL (L) | A VULNERABILITY EXPLOITABLE WITH LOCAL ACCESS MEANS THAT THE VULNERABLE COMPONENT IS NOT BOUND TO THE NETWORK STACK, AND THE ATTACKER'S PATH IS VIA READ/WRITE/EXECUTE CAPABILITIES. IN SOME CASES, THE ATTACKER MAY BE LOGGED IN LOCALLY IN ORDER TO EXPLOIT THE VULNERABILITY, OTHERWISE, SHE MAY RELY ON USER INTERACTION TO EXECUTE A MALICIOUS FILE |
| PHYSICAL (P) | A VULNERABILITY EXPLOITABLE WITH PHYSICAL ACCESS REQUIRES THE ATTACKER TO PHYSICALLY TOUCH OR MANIPULATE THE VULNERABLE COMPONENT. PHYSICAL INTERACTION MAY BE BRIEF (e.g. EVIL MAID ATTACK [1]) OR PERSISTENT. AN EXAMPLE OF SUCH AN ATTACK IS COLD BOOT ATTACK WHICH ALLOWS AN ATTACKER TO ACCESS TO DISK ENCRYPTION KEYS AFTER GAINING PHYSICAL ACCESS TO THE SYSTEM, OR PERIPHERAL ATTACKS SUCH AS FIREWIRE/USB DIRECT MEMORY ACCESS ATTACKS |

FIG. 3A

| FACTOR VALUE | DESCRIPTION |
|---|---|
| LOW (L) | SPECIALIZED ACCESS CONDITIONS OR EXTENUATING CIRCUMSTANCES DO NOT EXIST. AN ATTACKER CAN EXPECT REPEATABLE SUCCESS AGAINST THE VULNERABLE COMPONENT |
| HIGH (H) | A SUCCESSFUL ATTACK DEPENDS ON CONDITIONS BEYOND THE ATTACKER'S CONTROL. THAT IS, A SUCCESSFUL ATTACK CANNOT BE ACCOMPLISHED AT WILL, BUT REQUIRES THE ATTACKER TO INVEST IN SOME MEASURABLE AMOUNT OF EFFORT IN PREPARATION OR EXECUTION AGAINST THE VULNERABLE COMPONENT BEFORE A SUCCESSFUL ATTACK CAN BE EXPECTED. [2] FOR EXAMPLE, A SUCCESSFUL ATTACK MAY DEPEND ON AN ATTACKER OVERCOMING ANY OF THE FOLLOWING CONDITIONS: <br> - THE ATTACKER MUST CONDUCT TARGET-SPECIFIC RECONNAISSANCE. FOR EXAMPLE, ON TARGET CONFIGURATION SETTINGS, SEQUENCE NUMBERS, SHARED SECRETS, ETC. <br> - THE ATTACKER MUST PREPARE THE TARGET ENVIRONMENT TO IMPROVE EXPLOIT RELIABILITY. FOR EXAMPLE, REPEATED EXPLOITATION TO WIN A RACE CONDITION, OR OVERCOMING ADVANCED EXPLOIT MITIGATION TECHNIQUES. <br> - THE ATTACKER MUST INJECT HERSELF INTO THE LOGICAL NETWORK PATH BETWEEN THE TARGET AND THE RESOURCE REQUESTED BY THE VICTIM IN ORDER TO READ AND/OR MODIFY NETWORK COMMUNICATIONS (e.g. MAN IN THE MIDDLE ATTACK) |

FIG. 3B

| FACTOR VALUE | DESCRIPTION |
|---|---|
| NONE (N) | THE ATTACKER IS UNAUTHORIZED PRIOR TO ATTACK, AND THEREFORE DOES NOT REQUIRE ANY ACCESS TO SETTINGS OR FILES TO CARRY OUT AN ATTACK |
| LOW (L) | THE ATTACKER IS AUTHORIZED WITH (i.e. REQUIRES) PRIVILEGES THAT PROVIDE BASIC USER CAPABILITIES THAT COULD NORMALLY AFFECT ONLY SETTING AND FILES OWNED BY A USER. ALTERNATIVELY, AN ATTACKER WITH LOW PRIVILEGES MAY HAVE THE ABILITY TO CAUSE AN IMPACT ONLY TO NON-SENSITIVE RESOURCES |
| HIGH (H) | THE ATTACKER IS AUTHORIZED WITH (i.e. REQUIRES) PRIVILEGES THAT PROVIDE SIGNIFICANT (e.g. ADMINISTRATIVE) CONTROL OVER THE VULNERABLE COMPONENT THAT COULD AFFECT COMPONENT-WIDE SETTINGS AND FILES |

FIG. 3C

| FACTOR VALUE | DESCRIPTION |
|---|---|
| NONE (N | THE VULNERABLE SYSTEM CAN BE EXPLOITED WITHOUT INTERACTION FROM ANY USER |
| REQUIRED (R) | SUCCESSFUL EXPLOITATION OF THIS VULNERABILITY REQUIRES A USER TO TAKE SOME ACTION BEFORE THE VULNERABILITY CAN BE EXPLOITED. FOR EXAMPLE, A SUCCESSFUL EXPLOIT MAY ONLY BE POSSIBLE DURING THE INSTALLATION OF AN APPLICATION BY A SYSTEM ADMINISTRATOR |

FIG. 3D

| FACTOR VALUE | DESCRIPTION |
|---|---|
| UNCHANGED (U) | AN EXPLOITED VULNERABILITY CAN ONLY AFFECT RESOURCES MANAGED BY THE SAME AUTHORITY. IN THIS CASE THE VULNERABLE COMPONENT AND THE IMPACTED COMPONENT ARE THE SAME |
| CHANGED (C) | AN EXPLOITED VULNERABILITY CAN AFFECT RESOURCES BEYOND THE AUTHORIZATION PRIVILEGES INTENDED BY THE VULNERABLE COMPONENT. IN THIS CASE THE VULNERABLE COMPONENT AND THE IMPACTED COMPONENT ARE DIFFERENT |

FIG. 3E

| FACTOR VALUE | DESCRIPTION |
|---|---|
| HIGH (H) | THERE IS TOTAL LOSS OF CONFIDENTIALITY, RESULTING IN ALL RESOURCES WITHIN THE IMPACTED COMPONENT BEING DIVULGED TO THE ATTACKER. ALTERNATIVELY, ACCESS TO ONLY SOME RESTRICTED INFORMATION IS OBTAINED, BUT THE DISCLOSED INFORMATION PRESENTS A DIRECT, SERIOUS IMPACT. FOR EXAMPLE, AN ATTACKER STEALS THE ADMINISTRATOR'S PASSWORD, OR PRIVATE ENCRYPTION KEYS OF WEB SERVER |
| LOW (L) | THERE IS SOME LOSS OF CONFIDENTIALITY. ACCESS TO SOME RESTRICTED INFORMATION IS OBTAINED, BUT THE ATTACKER DOES NOT HAVE CONTROL OVER WHAT INFORMATION IS OBTAINED, OR THE AMOUNT OF KIND OF LOSS IS CONSTRAINED. THE INFORMATION DISCLOSURE DOES NOT CAUSE A DIRECT, SERIOUS LOSS TO THE IMPACTED COMPONENT |
| NONE (N) | THERE IS NO LOSS OF CONFIDENTIALITY WITHIN THE IMPACTED COMPONENT |

FIG. 3F

| FACTOR VALUE | DESCRIPTION |
|---|---|
| HIGH (H) | THERE IS A TOTAL LOSS OF INTEGRITY, OR A COMPLETE LOSS OF PROTECTION. FOR EXAMPLE, THE ATTACKER IS ABLE TO MODIFY ANY/ALL FILES PROTECTED BY THE IMPACTED COMPONENT. ALTERNATIVELY, ONLY SOME FILES CAN BE MODIFIED, BUT MALICIOUS MODIFICATION WOULD PRESENT A DIRECT, SERIOUS CONSEQUENCE TO THE IMPACTED COMPONENT |
| LOW (L) | MODIFICATION OF DATA IS POSSIBLE, BUT THE ATTACKER DOES NOT HAVE CONTROL OVER THE CONSEQUENCE OF A MODIFICATION, OR THE AMOUNT OF MODIFICATION IS CONSTRAINED. THE DATA MODIFICATION DOES NOT HAVE A DIRECT, SERIOUS IMPACT ON THE IMPACTED COMPONENT |
| NONE (N) | THERE IS NO LOSS OF INTEGRITY WITHIN THE IMPACTED COMPONENT |

FIG. 3G

| FACTOR VALUE | DESCRIPTION |
|---|---|
| HIGH (H) | THERE IS TOTAL LOSS OF AVAILABILITY, RESULTING IN THE ATTACKER BEING ABLE TO FULLY DENY ACCESS TO RESOURCES IN THE IMPACTED COMPONENT; THIS LOSS IS EITHER SUSTAINED (WHILE THE ATTACKER CONTINUES TO DELIVER THE ATTACK) OR PERSISTENT (THE CONDITION PERSISTS EVEN AFTER THE ATTACK HAS COMPLETED). ALTERNATIVELY, THE ATTACKER HAS THE ABILITY TO DENY SOME AVAILABILITY, BUT THE LOSS OF AVAILABILITY PRESENTS A DIRECT, SERIOUS CONSEQUENCE TO THE IMPACTED COMPONENT (e.g. THE ATTACKER CANNOT DISRUPT EXISTING CONNECTIONS, BUT CAN PREVENT NEW CONNECTIONS; THE ATTACKER CAN REPEATEDLY EXPLOIT A VULNERABILITY THAT, IN EACH INSTANCE OF A SUCCESSFUL ATTACK, LEAKS A ONLY SMALL AMOUNT OF MEMORY, BUT AFTER REPEATED EXPLOITATION CAUSES A SERVICE TO BECOME COMPLETELY UNAVAILABLE) |
| LOW (L) | THERE IS REDUCED PERFORMANCE OR INTERRUPTIONS IN RESOURCE AVAILABILITY. EVEN IF REPEATED EXPLOITATION OF THE VULNERABILITY IS POSSIBLE, THE ATTACKER DOES NOT HAVE THE ABILITY TO COMPLETELY DENY SERVICE TO LEGITIMATE USERS. THE RESOURCES IN THE IMPACTED COMPONENT ARE EITHER PARTIALLY AVAILABLE ALL OF THE TIME, OR FULLY AVAILABLE ONLY SOME OF THE TIME, BUT OVERALL THERE IS NO DIRECT, SERIOUS CONSEQUENCE TO THE IMPACTED COMPONENT |
| NONE (N) | THERE IS NO IMPACT TO AVAILABILITY WITHIN THE IMPACTED COMPONENT |

FIG. 3H

| FACTOR | FACTOR VALUE | NUMERICAL VALUE |
|---|---|---|
| ATTACK VECTOR | NETWORK<br>ADJACENT<br>NETWORK<br>LOCAL<br>PHYSICAL | 0.85<br>0.62<br>0.55<br>0.2 |
| ATTACK COMPLEXITY | LOW<br>HIGH | 0.77<br>0.44 |
| PRIVILEGE REQUIRED | NONE<br>LOW<br><br>HIGH | 0.85<br>0.62 (0.68 IF SCOPE/MODIFIED SCOPE<br>IS CHANGED)<br>0.27 (0.50 IF SCOPE/ MODIFIED SCOPE<br>IS CHANGED) |
| USER INTERACTION | NONE<br>REQUIRED | 0.85<br>0.62 |
| CONFIDENTIALITY,<br>INTEGRITY, AVAILABILITY | HIGH<br>LOW<br>NONE | 0.56<br>0.22<br>0 |

FIG. 3I

DETERMINING A SECURITY SCORE IN BINARY SOFTWARE CODE

TECHNICAL FIELD

The present disclosure relates to determining a security score in binary software code.

BACKGROUND

In some cases, software services can be provided by executable binary software code. The binary software code is computer software in a binary format. The computer software can be application software, system software (e.g., an operating system or a device driver), or a component of the application software or the system software.

The binary software code can be in a configuration of object code, executable code, or bytecode. An object code is the product of compiler output of a sequence of statements or instructions in a computer language. Computer programs can be written with source code that is logically divided into multiple source files. Each source file is compiled independently into a corresponding object file that includes object code. The object codes in the object files are binary machine codes, but they may not be ready to be executed. The object files can include incomplete references to subroutines outside themselves and placeholder addresses. During the linking process, these object files can be linked together to form one executable file that includes executable code that can be executed on a computing device. During the linking process, the linker can read the object files, resolve references between them, perform the final code layout in the memory that determines the addresses for the blocks of code and data, fix up the placeholder addresses with real addresses, and write out the executable file that contains the executable code.

A bytecode, also referred to as portable code or p-code, is a form of instruction set designed for efficient execution by a software interpreter. Bytecodes include compact numeric codes, constants, and references (normally numeric addresses) that encode the result of compiler parsing and performing semantic analysis of things like type, scope, and nesting depths of program objects. The bytecode includes instruction sets that have one-byte opcodes followed by optional parameters. Intermediate representations such as the bytecode may be output by programming language implementations to ease interpretation, or it may be used to reduce hardware and operating system dependence by allowing the same code to run cross-platform, on different devices. The bytecode may often be either directly executed on a virtual machine (a p-code machine i.e., interpreter), or it may be further compiled into machine code for better performance. In some cases, binary software code that is coded using platform-independent languages such as JAVA can be stored in the bytecode format.

DESCRIPTION OF DRAWINGS

FIG. 3A is a table listing example values of the attack vector factor, according to an implementation.

FIG. 3B is a table listing example values of the attack complexity factor, according to an implementation.

FIG. 3C is a table listing example values of the privileges required factor, according to an implementation.

FIG. 3D is a table listing example values of the user interaction factor, according to an implementation.

FIG. 3E is a table listing example values of the scope factor, according to an implementation.

FIG. 3F is a table listing example values of the confidentiality factor, according to an implementation.

FIG. 3G is a table listing example values of the integrity factor, according to an implementation.

FIG. 3H is a table listing example values of the availability factor, according to an implementation.

FIG. 3I is a table listing example numerical values corresponding to the letter values of different CVSS factors, according to an implementation.

Like reference numbers and designations in the various drawings indicate like elements.

DETAILED DESCRIPTION

In some cases, a software developer can submit software code to a software service platform that is operated by a software provider. The software code can be executed on the software service platform to provide software services to user devices. Alternatively or additionally, the software code can be downloaded to user devices. The software service platform can be implemented in one or more servers, or on a cloud-computing platform.

In some cases, the security risk of a binary software code can be indicated by a security score. An example of such a security score is a Common Vulnerability Scoring Standard (CVSS) score. The CVSS score is calculated based on a set of CVSS factors. The definition of the CVSS factors and the formula for calculating the CVSS score are published by the FIRST organization that maintains the CVSS standards.

In some cases, the values of the CVSS factors are assigned based on qualitive assessment. In one example, a software developer can select manually one of several letter values for each CVSS factor, and the CVSS score is calculated based on these selections. Such a process is inefficient because it requires manual input. The process is also inaccurate because it relies on qualitive assessment of the developer who inputs these selections, which may be biased and inconsistent.

In some implementations, the security score such as the CVSS score of a binary software score can be calculated automatically. The binary software code can be inspected and values of different security factors can be assigned automatically. The security score can be calculated based on these values. This approach can provide an efficient and accurate assessment of software risks of the binary software code. FIGS. 1-4 and associated descriptions provide additional details of these implementations.

Figure 1:
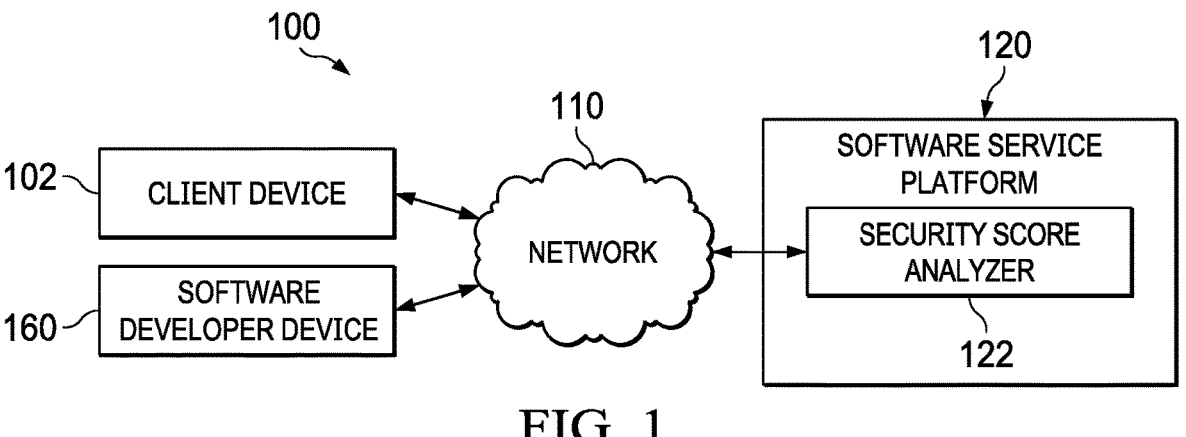
FIG. 1 is a schematic diagram showing an example communication system that determines security risks of binary software code, according to an implementation.

FIG. 1 is a schematic diagram showing an example communication system 100 that determines a security score of binary software code, according to an implementation. At a high level, the example communication system 100 includes a client device 102, a software developer device 160, and a software service platform 120 that are communicatively coupled with a network 110.

The software developer device 160 represents an application, a set of applications, software, software modules, hardware, or any combination thereof, that can be configured to submit the binary software code to the software service platform 120. The binary software code can be downloaded to the client device 102 to be exacted on the client device 102. The binary software code can also be executed on the software service platform 120 to provide software service to the client device 102. Examples of the software services can include software as a service (SaaS) applications such as SALESFORCE, OFFICE 365, or other software application services.

Figure 2:
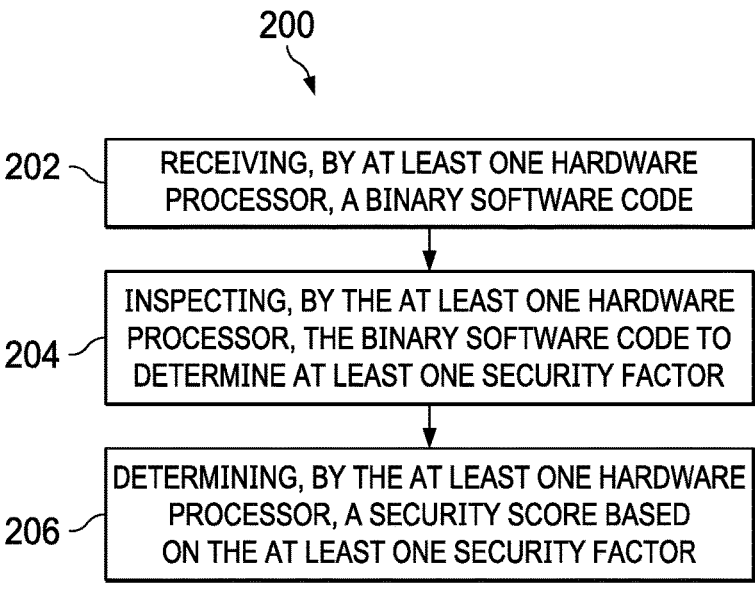
FIG. 2 is a flow diagram showing an example method that determines security risks of binary software code, according to an implementation.
Figure 4:
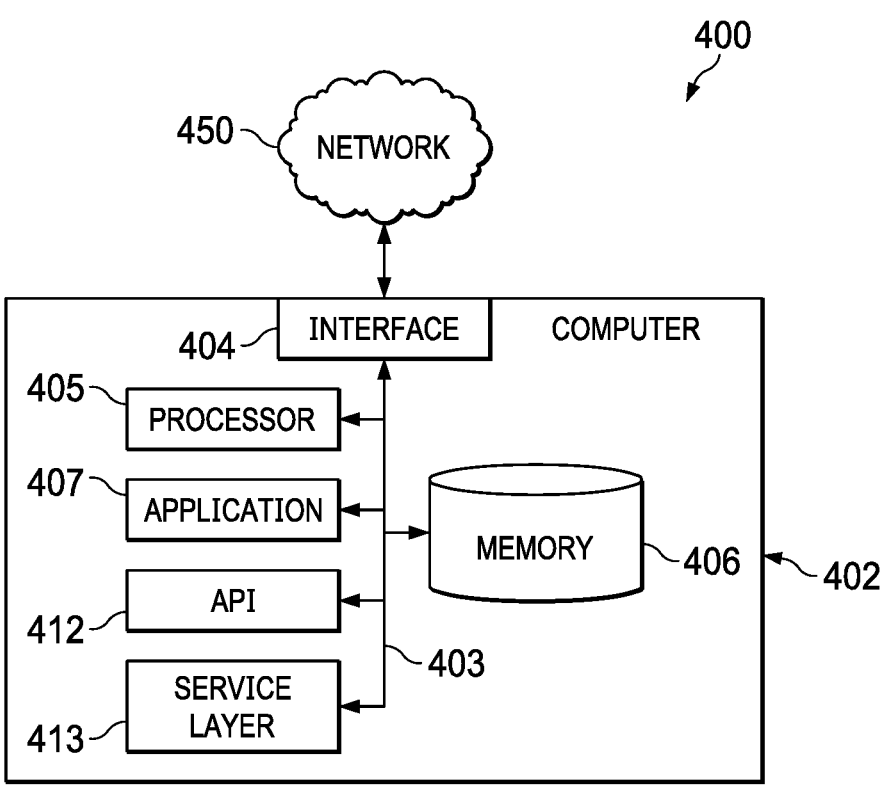
FIG. 4 is a high-level architecture block diagram of a computing system, according to an implementation.

The software service platform 120 includes a security score analyzer 122. The security score analyzer 122 represents an application, a set of applications, software, software modules, hardware, or any combination thereof, that can be configured to determine a security score for binary software codes. In some implementations, the security score analyzer 122 can determine a value for one or more security factors, and determine the secure score based on these security factors. The security score analyzer 122 can also generate a security notification indicating the security score. FIGS. 2-4 and associated descriptions provide additional details of these implementations.

The software service platform 120 can be implemented using one or more computers, computer servers, or a cloud-computing platform.

The client device 102 represents a device that can use the binary software code. In some cases, the binary software code can be installed on the client device 102, e.g., by downloading over the network 110 or copying locally onto the client device 102. Alternatively, the client device 102 can access a software service provided by the binary software code. In one example, a browser or a client application can be executed on the client device 102 to communicate service requests and service responses with the software service platform 120 to obtain software services.

Turning to a general description, the client device 102 may include, without limitation, any of the following: end-point, computing device, mobile device, mobile electronic device, user device, mobile station, subscriber station, portable electronic device, mobile communications device, wireless modem, wireless terminal, or other electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, vehicle, or other mobile communications devices having components for communicating voice or data via a wireless communication network. A vehicle can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used interchangeably herein.

The example communication system 100 includes the network 110. The network 110 represents an application, set of applications, software, software modules, hardware, or a combination thereof that can be configured to transmit data messages between the entities in the communication system 100. The network 110 can include a wireless network, a wireline network, the Internet, or a combination thereof. For example, the network 110 can include one or a plurality of radio access networks (RANs), core networks (CNs), and the Internet. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, the fifth generation (5G), or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within its coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may, instead, include a number of sub-modules, third-party services, components, libraries, and such, as appropriate. Furthermore, the features and functionality of various components can be combined into fewer components, as appropriate.

FIG. 2 is a flow diagram showing an example method 200 that determines a security score of binary software code, according to an implementation. The method 200 can be implemented by a software service platform, e.g., the software service platform 120 shown in FIG. 1. The method 200 shown can also be implemented using additional, fewer, or different entities. Furthermore, the method 200 can be implemented using additional, fewer, or different operations, which can be performed in the order shown or in a different order.

The example method 200 begins at 202, where a binary software code is received. In some cases, the binary software code is received at a software service platform. In one example, the binary software code can be submitted to the software service platform by a software developer, over a network. The binary software code can represent an application software, a system software (e.g., an operating system or a device driver), or a component thereof. The binary software code can be received without the corresponding source code of the software.

At 204, the software service platform inspects the binary software code to determine at least one security factor that is used to calculate a security score. In one example, the security score can be a CVSS score and the security factor can be one of the CVSS factors. Example of the CVSS factors include an attack vector factor, an attack complexity factor, a privileges required factor, a user interaction factor, a scope factor, a confidentiality factor, an integrity factor, and an availability factor.

The attack vector factor indicates the context by which vulnerability exploitation is possible. This metric value (and consequently the CVSS score) will be larger the more remote (logically, and physically) an attacker can be in order to exploit the vulnerable component. The assumption is that the number of potential attackers for a vulnerability that could be exploited from across the Internet is larger than the number of potential attackers that could exploit a vulnerability requiring physical access to a device, and therefore warrants a greater score. In some cases, letter values corresponding to a fixed number can be used. FIG. 3A is a table listing example values of the attack vector factor, according to an implementation. Alternatively, numerical value can be used to provide more granularity.

In some implementations, the value of the attack vector factor can be determined based on an inspection of the binary software code. The inspection can be used to determine a number of text strings present in the binary software code that are related to network functionalities. These text strings can correspond to network addresses that are accessed by the binary software code, APIs for network protocols (e.g., HyperText Transfer Protocol (HTTP), Hypertext Transfer Protocol Secure (HTTP), File Transfer Protocol (FTP) and the like), or other routines such as remote function calls or socket accesses. The number of these text strings and the types of these text strings can be used to determine the extent of network operations of the binary software code and thus can be used to determine the value of the attack vector factor. For example, if the number of network APIs such as HTTP or FTP, the number of network addresses, or the combination thereof in the binary software code exceeds a configured threshold, the value of the attack vector factor can be set to Network (N). Alternatively, if the numbers of network related functions or addresses do not exceed a first configured threshold, while the number of local functions, e.g., Universal Serial Bus (USB) port access, exceeds a second configured threshold, the value of the attack vector factor can be set to Adjacent (A). In some cases, a security evaluation policy can be configured at the software service platform, the security evaluation policy can include one or more thresholds discussed previously that can be used to determine the value of the attack vector factor. In some cases, the thresholds can be configured for different types of text strings. In some cases, different security evaluation policies can be provisioned for codes submitted by different software developers or codes that belong to a different category (e.g., system software, personal software, enterprise software, network software, gaming software, etc.).

In some implementations, the inspection can be performed by scanning the binary software code to identify text strings that are encoded in the binary software code. The scanning can be performed based on one or more encoding protocols. Examples of the encoding protocols include the American Standard Code for Information Interchange (ASCII) encoding protocol or the Unicode protocol. A text string includes one or more consecutive text characters. Examples of the text characters include alphabetic letters, numbers, punctuation marks, and symbols. In some cases, a text character can also be referred to as an alphanumeric character. Each text character is encoded into a binary number according to an encoding protocol. The size of the binary number can be 8 bits (1 byte), 16 bits (2 bytes), 32 bits (4 bytes), or 64 bits (8 bytes). For example, in ASCII protocol, the lower case letter "a" is encoded as 0x61, or "01100001" in binary number. In an encoding protocol, text characters are defined within a range of binary numbers. Therefore, by scanning the byte stream of the binary software code to check the values of each byte, two bytes, four bytes, or eight bytes (depending on the size of binary number of the encoding protocol), different text characters can be identified. For text characters that appear consecutively in the binary software code, these text characters form a text string. In some cases, the scanning can be performed from the beginning of the binary software code (forward scanning), from the end of the binary software code (backward scanning), or from both the beginning and the end of the binary software code (parallel scanning).

In some cases, the identified text strings that are encoded in the binary software code can be used to determine the presence of the network related functions discussed previously. These text strings can be identified based on a specific character or a specific character string. For example, a network address can be identified if the text string includes an email address or a Uniform Resource Locator (URL). Thus, an email address can be identified by the "@" character in the text string. A URL can be identified by the "HTTP," "HTTPS," or "FTP" characters in the text string. If such a specific character or character string is found in the text strings, the text strings can be a network related text string.

In some implementations, the software service platform can determine a configuration of the binary software code. The configuration of the binary software code can be object code, executable code, or bytecode. In some cases, the software developer can submit the binary software code in the configuration of object code. In these cases, the binary software code can be a collection of multiple object files that are compressed into one archive file, e.g., a zip file. Alternatively, the software developer can perform the link process and submit the executable file containing executable code. In some cases, e.g., if the binary software code was developed using JAVA, the software developer can submit the binary software code in a bytecode configuration. The software service platform can determine the configuration based on the types of the file in which binary software code is submitted. For example, if the binary software code is submitted in a zip file, the software service platform can determine that the binary software code is in an object code configuration. If the binary software code is submitted in an .exe file, the software service platform can determine that the binary software code is in an executable code configuration. Alternatively or in combination, the software service platform can determine the configuration by scanning the first few bytes of the binary software code. The first few bytes of the binary software code can be the header, which stores configuration information of the binary software code.

In some cases, based on the determined configuration, the software service platform can further extract a segment of the binary software code that stores constant values used by the binary software code. For example, if the binary software code is in the object code configuration, the software service platform can decompress the binary software code to obtain a collection of object files. The collection of object files can include a data segment, in some cases stored as a .data or a .h file, that stores constant values. Therefore, the software service platform can locate the data segment by searching for a .data or .h file in the collection of object files. In some cases, there can be more than one data segments in the binary software code.

If the binary software code was developed using JAVA, the binary software code may be in a bytecode configuration. In these cases, the configuration information in the header of the binary software code can indicate information of one or more constant tables that store constants used by the binary software code. The information can include locations of the constant tables and the numbers of entries in the constant tables. Based on the configuration information, the software service platform can extract the constant tables from the binary software code.

If the software service platform extracts data segments that include the constant values, the software service platform can scan these data segments to identify network addresses used by the binary software code. Comparing to scanning the entire binary software code for network addresses, this approach simplifies the scanning process, and therefore saves time and computing resources. In some cases, e.g., the binary software code is submitted in an executable file and the binary software code was developed using native languages such as C, the software service platform may not be able to extract these data segments. In these cases, the software service platform can scan the entire binary software code to determine network addresses that are accessed by the binary software code.

In some implementations, in addition to, or as an alternative to, the scanning of the binary software code, the binary software code can be disassembled into assembly code. The assembly code can be parsed into different assembly instructions. The software service platform can search the assembly instructions to determine network related operations of the binary software code.

In some cases, a source code corresponding to the binary software code can be obtained by using a disassembler, a decompiler, or both. The source code can be analyzed to determine if the code includes any network related text strings that are used to determine the value of the attack vector factor.

The attack complexity factor indicates the conditions beyond the attacker's control that must exist in order to exploit the vulnerability. Such conditions may require the collection of more information about the target, the presence of certain system configuration settings, or computational exceptions. In some cases, the assessment of this metric can exclude requirements for user interaction in order to exploit the vulnerability. In some cases, letter values corresponding to a fixed number can be used. FIG. 3B is a table listing example values of the attack complexity factor, according to an implementation. Alternatively, numerical value can be used to provide more granularity. In one example, if more complexity in the attack is required, then the code is less risky and the attack complexity factor can be set to a lower value.

The value of the attack complexity factor can be determined based of the number of compiler defenses, the obfuscation, validation routines, exception handlings, or any combinations thereof, used in the binary software code.

In some cases, the compiler may add non-functional features to the binary software code during compilation. These non-functional features can be referred to as compiler defenses. These non-functional features can include security routines that can increase the security of the binary software code. Examples of these non-functional features include stack cookies and data execution preventions. In some implementations, the stack cookies and data execution prevention can be added to the software code by the compiler, the developer, or a combination thereof. Other examples of non-functional features include certificate checking features that prevent the man in the middle attacks, and runtime access controls.

In software development, obfuscation is the act of creating source or machine code that is difficult for humans to understand. Programmers may deliberately obfuscate code to conceal its purpose (security through obscurity) or its logic or implicit values embedded in it. This can be done manually or by using an automated tool. One advantage of automated code obfuscation is that it helps protect the trade secrets (intellectual property) contained within software by making reverse-engineering a program difficult and economically unfeasible. Other advantages might include helping to protect licensing mechanisms and unauthorized access, and shrinking the size of the executable. On the other hand, obfuscation can be used to hide malicious code, increase the difficulty and effectiveness of testing and vulnerability detecting procedures, or become an indicator that malicious intruders would aim to attack.

The software service platform can determine the number of instances in which these techniques are used in the binary software code by using the inspection operation discussed previously. For example, the software service platform can disassemble the binary software code, and extract these routines from the assembly code. The software service platform can also scan the binary software code to extract text strings corresponding to these routines. The software service platform can determine the value of the attack complexity factor by comparing the number of instances in which these techniques are used in the code with one or more configured thresholds. In some cases, the higher the number of the techniques used, the more secure the code is, and thus a lower value is assigned. These configured thresholds can be included in one or more security evaluation profiles discussed previously.

The privileges required factor indicates the level of privileges an attacker must possess before successfully exploiting the vulnerability. In some cases, letter values corresponding to a fixed number can be used. FIG. 3C is a table listing example values of the privileges required factor, according to an implementation. Alternatively, numerical value can be used to provide more granularity. In one example, if a higher level of privilege is required, then the code is less risky and the privileges required factor can be set to a lower value.

The value of the privileges required factor can be determined based of the number of privilege related API in the binary software code. Examples of privileged related API may include APIs that requests services from the kernel of the operating system, e.g., accessing a memory device, creating or executing a process, and communicating with integral kernel services such as process scheduling. The software service platform can determine the number of these APIs by using the inspection operation discussed previously. For example, the software service platform can disassemble the binary software code, and extract these APIs from the assembly code. The software service platform can also scan the binary software code to extract text strings corresponding to these APIs. The software service platform can determine the value of the privileges required factor by comparing the number of these APIs and the type of these APIs with one or more configured thresholds in one or more security evaluation profiles discussed previously.

The user interaction factor indicates the requirement for a user, other than the attacker, to participate in the successful compromise of the vulnerable component. This factor indicates whether the vulnerability can be exploited solely at the will of the attacker, or whether a separate user (or user initiated process) must participate in some manner. In some cases, letter values corresponding to a fixed number can be used. FIG. 3D is a table listing example values of the user interaction factor, according to an implementation. Alternatively, numerical value can be used to provide more granularity. In one example, if a higher level of user interaction is required, then the code is less risky and the user interaction factor can be set to a lower value.

The value of the user interaction factor can be determined based of the number of routines related to user interface control or user input mechanisms in the binary software code. Additionally or alternatively, the level of user interaction in the binary software code can be determined by the presence of routines related to exporting address table or inter-process communication (IPC) functionality. The software service platform can determine the number of these routines by using the inspection operation discussed previously. For example, the software service platform can disassemble the binary software code, and extract these routines from the assembly code. The software service platform can also scan the binary software code to extract text strings corresponding to these routines. For example, the software service platform can determine whether the text strings match one of more keywords related to these routines. Examples of these keywords can include names of functions that can be used to send messages (e.g., "SendMessage," "PostMessage," and "PostThreadMessage"), names of functions that provides an interface to the Dynamic Data Exchange (DDE) message passing protocol (e.g., "DdeConnect," and DdeGetData" P, or names of specific constants or values used by these routines, (e.g., "INVALID_-HANDLE_VALUE." The software service platform can determine the value of the user interaction factor by comparing the number of these routines with one or more configured thresholds in one or more security evaluation profiles discussed previously.

Scope refers to the level of privileges defined by a computing authority (e.g., an application, an operating system, or a sandbox environment) when granting access to computing resources (e.g., files, CPU, memory, etc.). These privileges are assigned based on some method of identification and authorization. In some cases, the authorization may be simple or loosely controlled based upon predefined rules or standards. For example, in the case of Ethernet traffic sent to a network switch, the switch accepts traffic that arrives on its ports and is an authority that controls the traffic flow to other switch ports.

When the vulnerability of a software component governed by one authorization scope is able to affect resources governed by another authorization scope, a Scope change has occurred. Intuitively, one may think of a scope change as breaking out of a sandbox, and an example would be a vulnerability in a virtual machine that enables an attacker to delete files on the host operating system (OS) (perhaps even its own virtual machine (VM)). In this example, there are two separate authorization authorities: one that defines and enforces privileges for the virtual machine and its users, and one that defines and enforces privileges for the host system within which the virtual machine runs.

A scope change would not occur, for example, with a vulnerability in Microsoft Word that allows an attacker to compromise all system files of the host OS, because the same authority enforces privileges of the user's instance of Word, and the host's system files.

The scope factor indicates the vulnerability related to scope change. In some cases, letter values corresponding to a fixed number can be used. FIG. 3E is a table listing example values of the scope factor, according to an implementation. Alternatively, numerical value can be used to provide more granularity. In one example, if an exploited vulnerability can affect resources beyond the authorization privileges intended by the vulnerable component, then the code is more risky and the scope factor can be set to a higher value.

The value of the scope factor can be determined based of the analysis on the scope change of the binary software code. In some implementations, the scope factor can be set to the average value and adjusted according to heuristics analysis. The software service platform can determine the number of routines by using the inspection operation discussed previously. For example, the software service platform can disassemble the binary software code, and extract these routines from the assembly code. The software service platform can also scan the binary software code to extract text strings corresponding to these routines. The software service platform can determine the value of the scope factor by comparing the number of the number of these routines with one or more configured thresholds in one or more security evaluation profiles discussed previously.

The confidentiality factor indicates the impact to the confidentiality of the information resources managed by a software component due to a successfully exploited vulnerability. Confidentiality refers to limiting information access and disclosure to only authorized users, as well as preventing access by, or disclosure to, unauthorized ones. In some cases, letter values corresponding to a fixed number can be used. FIG. 3F is a table listing example values of the confidentiality factor, according to an implementation. Alternatively, numerical value can be used to provide more granularity. In one example, if a higher level of confidentiality may be lost, then the code is more risky and the user interaction factor can be set to a higher value.

The value of the confidentiality factor can be determined based of the number of routines related to data protection in the binary software code. In one example, the software service platform can determine the value of confidentiality factor based on the numbers of cryptographic routines, the type of security protocols used, the size of encryption and authentication keys used, the types of certificate used, or any combinations thereof. The software service platform can determine these metrics by using the inspection operation discussed previously. For example, the software service platform can disassemble the binary software code, and extract cryptographic routines from the assembly code. The software service platform can also scan the binary software code to extract text strings corresponding to cryptographic routines. For example, the software service platform can determine whether the text strings match one of more keywords related to cryptographic routines. The software service platform can determine the value of the confidentiality factor by comparing these metrics with one or more configured thresholds in one or more security evaluation profiles discussed previously.

The integrity factor indicates the impact to integrity of a successfully exploited vulnerability. Integrity refers to the trustworthiness and veracity of information. In some cases, letter values corresponding to a fixed number can be used. FIG. 3G is a table listing example values of the integrity factor, according to an implementation. Alternatively, numerical value can be used to provide more granularity. In one example, if a higher level of integrity may be lost, then the code is more risky and the user interaction factor can be set to a higher value.

The value of the integrity factor can be determined based of the occurrences of specific routines or sequences of routines in the binary software code. Examples of these routines or sequences include memory corruption and Structured Query Language (SQL) Injection (SQLi). In some implementations, the software service platform can determine the value of integrity factor based on the numbers of these routines in the code by using the inspection operation discussed previously. In some cases, a list of taxonomy related to these routines can be stored at the software service platform. The software service platform can disassemble the binary software code, and search for these routines or sequences from the assembly code. The software service platform can determine the value of the integrity factor by comparing the number of these routines or sequences with one or more configured thresholds in one or more security evaluation profiles discussed previously.

The availability factor indicates the impact to the availability of the impacted component resulting from a successfully exploited vulnerability. While the confidentiality and integrity factors apply to the loss of confidentiality or integrity of data (e.g., information, files) used by the impacted component, the availability factor refers to the loss of availability of the impacted component itself, such as a networked service (e.g., web, database, email). Since availability refers to the accessibility of information resources, attacks that consume network bandwidth, processor cycles, or disk space all impact the availability of an impacted component. In some cases, letter values corresponding to a fixed number can be used. FIG. 3H is a table listing example values of the availability factor, according to an implementation. Alternatively, numerical value can be used to provide more granularity. In one example, if a higher level of availability, may be lost, then the code is more risky and the user interaction factor can be set to a higher value.

The value of the availability factor can be determined based of the analysis on the availability of the binary software code. In some implementations, the availability factor can be set to the average value and adjusted according to heuristics analysis. The software service platform can determine the number of routines related to network communications or writing requests on peripherals such as a hard disk drive (HDD) by using the inspection operation discussed previously. For example, the software service platform can disassemble the binary software code, and extract these routines from the assembly code. The software service platform can also scan the binary software code to extract text strings corresponding to these routines. The software service platform can determine the value of the availability factor by comparing the number of the number of these routines with one or more configured thresholds in one or more security evaluation profiles discussed previously.

In some cases, additional security factors can be configured. The software service platform can evaluate these additional security factors by inspecting the code and search for specific routines or text strings as discussed previously.

At 206, the security score is determined based on at least one of these security factors. In one example, the security score is a CVSS score and the CVSS score can be calculated based on the CVSS formula. The CVSS formula is published by the FIRST organization. FIG. 3I is a table listing example numerical values corresponding to the letter values of different CVSS factors discussed previously, according to an implementation. Following is an example calculation of the CVSS score using these values:

If (Impact sub score<=0) CVSS score=0
else,
CVSS score=Scope Unchanged Round up(Minimum [(Impact+Exploitability),10]) or Scope Changed Round up(Minimum[1.08×(Impact+Exploitability), 10])
where Impact sub score (ISC) is defined as,
Scope Unchanged 6.42×ISCBase OR Scope Changed 7.52×[ISCBase−0.029]−3.25×[ISCBase−0.02]
where ISCBase=1−[(1−Confidentiality)×(1−Integrity)× (1−Availability)], Exploitability=8.22×AttackVector× AttackComplexity×PrivilegeRequired×UserInteraction In some cases, other formula or methodologies can be configured at the software service platform for calculation of the security factor.

In some cases, the software service platform can output the security score. In one example, the software service platform can generate a security notification that indicates the security score. The security notification can also indicate the value of each security factor. In some cases, the software service platform can further determine the security risk level of the binary software code based on the security score, e.g., by comparing the security score with a set of thresholds (e.g., high, medium, low). The software service platform can include the security risk level in the notification. In some cases, the security notification can further indicate that the binary software code has a higher security risk, a similar security risk, or a lower security risk than other software codes that have the same functional context. In some cases, the security notification can also include one of more statistical metrics of the security risk levels or security scores of other software code having the same functional context (e.g., average, variance). In the cases where software code that is further divided into classes, the security notification can include information of security risk levels or security scores for the software code within the same class.

In some cases, the security notification can be outputted at the software service platform, e.g., displayed on a graphic user interface on the software service platform. This approach enables an enterprise that operates the software service platform to be informed of security risks of the software submitted to the platform. In some cases, the enterprise that operates the software service platform can enforce policies regarding the software security of codes on the platform. For example, the software service platform can include, or be coupled with, an app store for a device to download the software code, or a software as a service (SaaS) server that provides software service using the software code. If the security notification indicates that the binary software code is relatively unsafe, the software service platform can prevent the binary software code from being available to devices for use or download.

Alternatively or additionally, the security notification can be transmitted to the software developer device that submits the binary software code. This approach enables the software developer to receive the comparison result of the security risk assessment and make modification accordingly.

In some cases, the software service platform can store the security score of the binary software code associated with the functional context of the binary software code in the database. Therefore, the security score of the binary software code can be used in comparison with another software code that has the same functional context.

FIG. 4 is a high-level architecture block diagram showing a computer 402 coupled with a network 450, according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 450 facilitates communications between the computer 402 and other devices. In some cases, a user, e.g., an administrator, can access the computer 402 from a remote network. In these or other cases, the network 450 can be a wireless or a wireline network. In some cases, a user can access the computer 402 locally. In these or other cases, the network 450 can also be a memory pipe, a hardware connection, or any internal or external communication paths between the components.

The computer 402 includes a computing system configured to perform the algorithm described in this disclosure. For example, the computer 402 can be used to implement the security score analyzer 122 shown in FIG. 1. The computer 402 can also be used to implement other computing devices, e.g., the software developer device 160 or the client device 102 shown in FIG. 1. In some cases, the algorithm can be implemented in an executable computing code, e.g., C/C++ executable codes. Alternatively, or in combination, the algorithm can be implemented in an application program, e.g., EXCEL. In some cases, the computer 402 can include a standalone LINUX system that runs batch applications. In some cases, the computer 402 can include mobile or personal computers that run the application program.

The computer 402 may include an input device, such as a keypad, keyboard, touch screen, microphone, speech recognition device, or another device that can accept user information, and/or an output device that conveys information associated with the operation of the computer 402, including digital data, visual and/or audio information, or a GUI.

The computer 402 can serve as a client, network component, a server, a database or other persistency, or the like. In some implementations, one or more components of the computer 402 may be configured to operate within a cloud-computing-based environment.

At a high level, the computer 402 is an electronic computing device operable to receive, transmit, process, store, or manage data and information. According to some implementations, the computer 402 may also include or be communicably coupled with an application server, e-mail server, web server, caching server, streaming data server, business intelligence (BI) server, and/or other server.

The computer 402 can receive requests over network 450 from a client application (e.g., executing on a client device) and respond to the received requests by processing said requests in an appropriate software application. In addition, requests may also be sent to the computer 402 from internal users (e.g., from a command console or by another appropriate access method), external or third parties, other automated applications, as well as any other appropriate entities, individuals, systems, or computers.

Each of the components of the computer 402 can communicate using a system bus 403. In some implementations, any and/or all the components of the computer 402, both hardware and/or software, may interface with each other and/or the interface 404 over the system bus 403, using an application programming interface (API) 412 and/or a service layer 413. The API 412 may include specifications for routines, data structures, and object classes. The API 412 may be either computer language-independent or -dependent and refer to a complete interface, a single function, or even a set of APIs. The service layer 413 provides software services to the computer 402. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in Extensible Markup Language (XML) format or other suitable format. While illustrated as an integrated component of the computer 402, alternative implementations may illustrate the API 412 and/or the service layer 413 as stand-alone components in relation to other components of the computer 402. Moreover, any or all parts of the API 412 and/or the service layer 413 may be implemented as child or sub-modules of another software module or hardware module, without departing from the scope of this disclosure.

The computer 402 includes an interface 404. Although illustrated as a single interface 404 in FIG. 4, two or more interfaces 404 may be used according to particular needs, configurations, or particular implementations of the computer 402. The interface 404 is used by the computer 402 for communicating with other systems in a distributed environment connected to the network 450 (whether illustrated or not). Generally, the interface 404 comprises logic encoded in software and/or hardware in a suitable combination and operable to communicate with the network 450. More specifically, the interface 404 may comprise software supporting one or more communication protocols associated with communications such that the network 450 or interface's hardware are operable to communicate physical signals.

The computer 402 includes a processor 405. Although illustrated as a single processor 405 in FIG. 4, two or more processors may be used according to particular needs, configurations, or particular implementations of the computer 402. Generally, the processor 405 executes instructions and manipulates data to perform the operations of the computer 402. In some cases, the processor 405 can include a data processing apparatus.

The computer 402 also includes a memory 406 that holds data for the computer 402. Although illustrated as a single memory 406 in FIG. 4, two or more memories may be used according to particular needs, configurations, or particular implementations of the computer 402. While memory 406 is illustrated as an integral component of the computer 402, in alternative implementations, memory 406 can be external to the computer 402.

The application 407 comprises an algorithmic software engine providing functionality according to particular needs, configurations, or particular implementations of the computer 402. Although illustrated as a single application 407, the application 407 may be implemented as multiple applications 407 on the computer 402. In addition, although illustrated as integral to the computer 402, in alternative implementations, the application 407 can be external to the computer 402.

There may be any number of computers 402 associated with, or external to, the system 400 and communicating over network 450. Further, the terms "client," "user," and other appropriate terminology may be used interchangeably, as appropriate, without departing from the scope of this disclosure. Moreover, this disclosure contemplates that many users may use one computer 402, or that one user may use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM), or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media, transitory or non-transitory, suitable for storing computer program instructions and data include all forms of non-volatile memory, media and memory devices, including by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to, or represent, the functions of the web browser.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a transitory or non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A computer-implemented method, comprising:
receiving, by at least one hardware processor on a software service platform, a binary software code;
inspecting, by the at least one hardware processor, the binary software code to determine at least one Common Vulnerability Scoring Standard (CVSS) factor, wherein the at least one CVSS factor comprises an attack vector factor, and the inspecting the binary software code comprises:
scanning a byte stream of the binary software code to detect text strings related to remote network functionalities that will be performed by a device executing the binary software code, wherein detecting text strings related to the remote network functionalities comprises detecting text strings corresponding to a network protocol in the binary software code;
determining a first numerical number of the text strings related to remote network functionalities;
comparing the first numerical number of text strings related to the remote network functionalities and a first configured number threshold for remote network functionalities;
determining a second numerical number of text strings related to local network functionalities that will be performed by the device executing the binary software code;
comparing the second numerical number of text strings related to local remote network and a second configured number threshold for local network functionalities; and
determining the attack vector factor based on the comparing between the first numerical number and the first configured number threshold for remote network functionalities and the comparing between the second numerical number and the second configured number threshold for local network functionalities;
determining, by the at least one hardware processor, a CVSS score based on the at least one CVSS factor; and
outputting, by the software service platform, the CVSS score.

2. The method of claim 1, wherein the at least one CVSS factor comprises at least one of an attack complexity factor, a privileges required factor, a user interaction factor, a scope factor, a confidentiality factor, an integrity factor, or an availability factor.

3. The method of claim 1, wherein the at least one CVSS factor comprises an attack complexity factor, and the inspecting the binary software code comprises:
determining a number of routines related to compiler defense, obfuscation, validation, or exception handling in the binary software code, and
determining the attack complexity factor based on the number of routines related to compiler defense, obfuscation, validation, or exception handling.

4. The method of claim 1, wherein the at least one CVSS factor comprises a privileges required factor, and the inspecting the binary software code comprises:
determining a number of application program interfaces (APIs) related to privilege processing in the binary software code, and
determining the privileges required factor based on the number of APIs related to privilege processing.

5. The method of claim 1, wherein the at least one CVSS factor comprises a user interaction factor, and the inspecting the binary software code comprises:
determining a number of routines related to user input in the binary software code, and determining the user interaction factor based on the number of routines related to user input.

6. A server, comprising:

at least one hardware processor; and one or more computer-readable storage media coupled to the at least one hardware processor and storing programming instructions for execution by the at least one hardware processor, wherein the programming instructions, when executed, cause the at least one hardware processor to perform operations comprising:

receiving a binary software code;

inspecting the binary software code to determine at least one Common Vulnerability Scoring Standard (CVSS) factor, wherein the at least one CVSS factor comprises an attack vector factor, and the inspecting the binary software code comprises:

scanning a byte stream of the binary software code to detect text strings related to remote network functionalities that will be performed by a device executing the binary software code, wherein detecting text strings related to the remote network functionalities comprises detecting text strings corresponding to a network protocol in the binary software code;

determining a first numerical number of the text strings related to remote network functionalities;

comparing the first numerical number of text strings related to the remote network functionalities and a first configured number threshold for remote network functionalities;

determining a second numerical number of text strings related to local network functionalities that will be performed by the device executing the binary software code;

comparing the second numerical number of text strings related to local remote network and a second configured number threshold for local network functionalities; and determining the attack vector factor based on the comparing between the first numerical number and the first configured number threshold for remote network functionalities and the comparing between the second numerical number and the second configured number threshold for local network functionalities;

determining a CVSS score based on the at least one CVSS factor; and outputting, at the server, the CVSS score.

7. The server of claim 6, wherein the at least one CVSS factor comprises at least one of an attack complexity factor, a privileges required factor, a user interaction factor, a scope factor, a confidentiality factor, an integrity factor, or an availability factor.

8. The server of claim 6, wherein the at least one CVSS factor comprises an attack complexity factor, and the inspecting the binary software code comprises:

determining a number of routines related to compiler defense, obfuscation, validation, or exception handling in the binary software code, and determining the attack complexity factor based on the number of routines related to compiler defense, obfuscation, validation, or exception handling.

9. The server of claim 6, wherein the at least one CVSS factor comprises a privileges required factor, and the inspecting the binary software code comprises:

determining a number of application program interfaces (APIs) related to privilege processing in the binary software code, and determining the privileges required factor based on the number of APIs related to privilege processing.

10. The server of claim 6, wherein the at least one CVSS factor comprises a user interaction factor, and the inspecting the binary software code comprises:

determining a number of routines related to user input in the binary software code, and determining the user interaction factor based on the number of routines related to user input.

11. One or more non-transitory computer-readable media containing instructions which, when executed, cause a computing device to perform operations comprising:

receiving, by at least one hardware processor, a binary software code;

inspecting, by the at least one hardware processor, the binary software code to determine at least one Common Vulnerability Scoring Standard (CVSS) factor, wherein the at least one CVSS factor comprises an attack vector factor, and the inspecting the binary software code comprises:

scanning a byte stream of the binary software code to detect text strings related to remote network functionalities that will be performed by a device executing the binary software code, wherein detecting text strings related to the remote network functionalities comprises detecting text strings corresponding to a network protocol in the binary software code;

determining a first numerical number of the text strings related to remote network functionalities;

comparing the first numerical number of text strings related to the remote network functionalities and a first configured number threshold for remote network functionalities;

determining a second numerical number of text strings related to local network functionalities that will be performed by the device executing the binary software code;

comparing the second numerical number of text strings related to local remote network and a second configured number threshold for local network functionalities; and determining the attack vector factor based on the comparing between the first numerical number and the first configured number threshold for remote network functionalities and the comparing between the second numerical number and the second configured number threshold for local network functionalities;

determining, by the at least one hardware processor, a CVSS score based on the at least one CVSS factor; and outputting, at the computing device, the CVSS score.

12. The computer-readable media of claim 11, wherein the at least one CVSS factor comprises at least one of an attack complexity factor, a privileges required factor, a user interaction factor, a scope factor, a confidentiality factor, an integrity factor, or an availability factor.

13. The computer-readable media of claim 11, wherein the at least one CVSS factor comprises an attack complexity factor, and the inspecting the binary software code comprises:

determining a number of routines related to compiler defense, obfuscation, validation, o exception handling in the binary software code, and determining the attack complexity factor based on the number of routines related to compiler defense, obfuscation, validation, or exception handling.

14. The computer-readable media of claim 11, wherein the at least one CVSS factor comprises a privileges required factor, and the inspecting the binary software code comprises:

determining a number of application program interfaces (APIs) related to privilege processing in the binary software code, and determining the privileges required factor based on the number of APIs related to privilege processing.

15. The computer-readable media of claim 11, wherein the at least one CVSS factor comprises a user interaction factor, and the inspecting the binary software code comprises:

determining a number of routines related to user input in the binary software code, and determining the user interaction factor based on the number of routines related to user input.

\*  \*  \*  \*  \*